United States Patent
Erickson

[15] 3,702,936
[45] Nov. 14, 1972

[54] DOSE RATE DOSIMETER CIRCUIT

[72] Inventor: Gerald L. Erickson, Richland, Wash.

[73] Assignee: The United States of America as represented by the United States Atomic Energy Commission

[22] Filed: March 19, 1971

[21] Appl. No.: 126,222

[52] U.S. Cl. .............................. 250/83.6 R, 328/150
[51] Int. Cl. .................................................. G01t 1/18
[58] Field of Search ...................... 250/83.6; 328/150

[56] References Cited

UNITED STATES PATENTS

| | | | |
|---|---|---|---|
| 2,993,995 | 7/1961 | Pinckaers | 250/83.6 |
| 2,838,680 | 6/1958 | Bender | 250/83.6 |
| 2,874,305 | 2/1959 | Wilson | 250/83.6 |
| 2,983,818 | 5/1961 | Constable | 250/83.6 |
| 3,157,789 | 11/1964 | Thomas | 250/83.6 |
| 3,161,774 | 12/1964 | Pinckaers | 250/83.6 |
| 3,113,212 | 12/1963 | Weil | 250/83.3 |

Primary Examiner—James W. Lawrence
Assistant Examiner—D. C. Nelms
Attorney—Roland A. Anderson

[57] ABSTRACT

The circuit uses the ionization characteristics of a Geiger-Mueller tube to provide equal energy charging pulses for an integrator. The integrator voltage is compared with a reference voltage to develop an alarm signal when the integrator voltage exceeds a preset level. Both the integrator and the circuit developing the reference voltage are connected to the same power supply so that power supply fluctuations have a minimum effect on the radiation level at which the alarm operates. A single variable resistance can be used to change the ranges over which the dosimeter operates.

7 Claims, 1 Drawing Figure

PATENTED NOV 14 1972  3,702,936
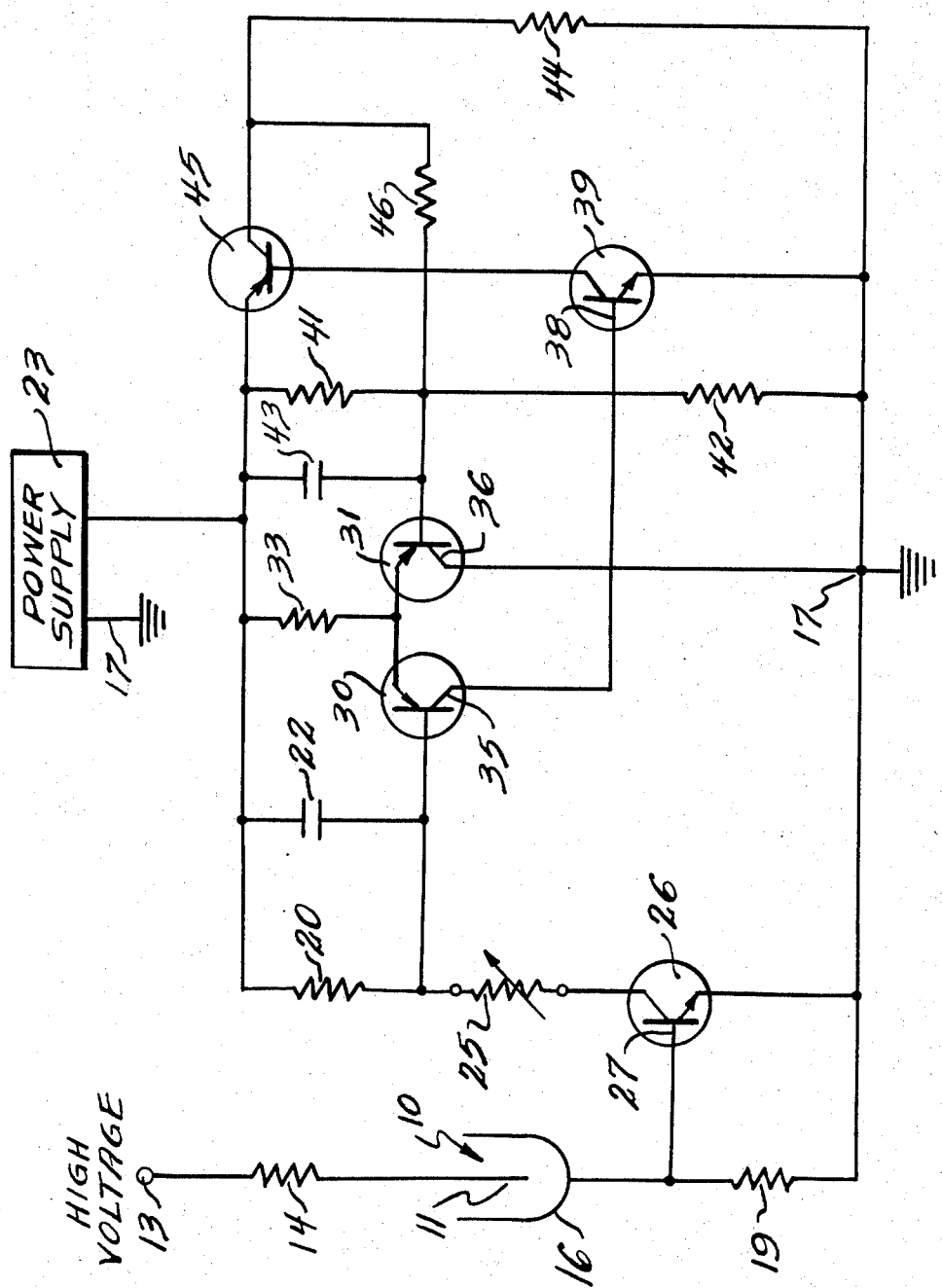
Inventor
Gerald L. Erickson
Attorney

DOSE RATE DOSIMETER CIRCUIT

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In a miniaturized alarm dosimeter of the rate type, considerable circuit complexity and physical size is required to provide a selectable dose rate alarm function. Various types of circuits have been used to carry out this function and most of these circuits require that some form of pulse shaping be used in order to provide equal energy pulses for the integrator circuit. In some rate dosimeters the energy in each pulse is reduced when the received radiation becomes excessive. The reduction in pulse energy may be sufficient to reduce the amount of radiation indicated as being received by the dosimeter when in fact the received radiation has increased. When very large amounts of radiation are received the Geiger-Mueller tube develops a continuous output current instead of a pulse output and the indicated amount of radiation typically drops to zero in pulse dosimeter circuits.

Changes in the range covered by the dosimeter has been accomplished by changing the value of capacitors and/or inductors in the circuit. These types of circuit comparator configurations become somewhat complex and cumbersome to effect large range changes in alarm set points when all of the input pulse shaping and comparator circuits are added. In addition, these circuits require a voltage regulated d-c supply bus to obtain consistent results. The regulating circuit has additional package requirements and additional battery power drain.

It is therefore an object of this invention to provide an improved dose rate dosimeter circuit.

Another object of this invention is to provide a dose rate dosimeter which does not require a regulated d-c supply.

Another object of this invention is to provide a dose rate dosimeter in which range changes can be accomplished by changing the value of a single resistor.

Another object of this invention is to provide a dose rate dosimeter which does not require special pulse shaping circuits and which does not suffer from a reduction in energy per pulse with high dose rates.

Another object of this invention is to provide a dose rate dosimeter which does not show a drop in indicated measured radiation in very strong radiation fields.

SUMMARY OF THE INVENTION

In practicing this invention a dose rate dosimeter is provided in which the ionization time of the Geiger-Mueller tube determines the width of a control pulse which biases a transistor to saturation. When the dosimeter is in a very strong radiation field which causes continuous ionization of the Geiger-Mueller tube the transistor is continuously biased to saturation. An integrator has one terminal coupled to a power supply and a second terminal. A transistor and a resistor are coupled in series between the second terminal and the power supply. With the transistor biased to conduction, the integrating means is charged through the resistor. The charge stored in the integrating means is a function of the rate at which the Geiger-Mueller tube receives ionizing radiation. The value of the resistor can be changed to change the range over which the dosimeter operates. A comparator coupled to the integrator uses a reference voltage derived from the same power supply to determine when the integrator voltage exceeds a preset value. Since the integrating means and the reference voltage circuit are coupled to the same power supply, changes in the voltage of the power supply are effectively cancelled out and regulation of the power supply is not required.

DESCRIPTION OF THE DRAWINGS

The invention is illustrated in the single drawing, a partial block diagram and a partial schematic showing the circuit of this invention.

DETAILED DESCRIPTION OF THE INVENTION

Referring to the drawing there is shown a Geiger-Mueller tube 10 having an anode 11 coupled to high voltage terminal 13 through resistor 14. The cathode 16 is coupled to a reference potential 17 through resistor 19. An integrating circuit consisting of resistor 20 and capacitor 22 is coupled to a power supply 23 and a resistor 25. Resistor 25 is coupled to the reference potential 17 through transistor 26. Base 27 of transistor 26 is coupled to the cathode 16 of Geiger-Mueller tube 10 and to resistor 19. Resistor 25 may be a variable resistor or may consist of a switch connecting one of several resistors in series with the integrating circuit and transistor 26.

A comparator circuit consists of transistors 30 and 31 having a common emitter connection to the power supply 23 through resistor 33. Collector 36 of transistor 31 is connected to the reference potential 17 and collector 35 of transistor 30 is coupled to base 38 of transistor 39. A reference voltage for the comparator is provided by means of a voltage divider consisting of resistors 41 and 42. An alarm represented by resistor 44 is coupled to power supply 23 through transistor 45.

When the Geiger-Mueller tube 10 receives ionizing radiation, the gas within the tube is ionized and tube 10 conducts. It has been found that the duration of ionization or conduction of Geiger-Mueller tube 10 is relatively constant with respect to pulse rate, supply voltage, time and temperature so that a pulse having a particular time duration is developed each time ionizing radiation strikes tube 10. However, the Geiger-Mueller tube current through resistor 19 and the base-emitter junction of transistor 26 during the ionizing period varies depending upon the amount of time the tube has had to recover after the ionizing period is terminated. Thus, the output pulses from the Geiger-Mueller tube cannot be used directly in an integrator as their energy is not constant. When the radiation rate received by the Geiger-Mueller tube 10 is very high, there is not sufficient time for the tube to recover between ionizing events and the energy produced at the output of the tube during each pulse is relatively low. Unless very complex circuitry was used in prior art dosimeters, there was the possibility that the dosimeter would indicate a reduced rate of radiation when in fact the tube was receiving an increased rate of radiation. Where the radiation field in which the Geiger-Mueller tube is placed is very high, the Geiger-Mueller tube would be ionized continuously and distinct output pulses would not be developed. In many prior art dosimeters the indicated radiation would drop to zero under these conditions.

In the circuit shown in the drawing, the Geiger-Mueller tube current flows through resistor 19 and the base-emitter junction of transistor 26 and it is sufficient to bias transistor 26 to saturation. It can easily be recognized that if a single transistor could not be biased to saturation, additional amplification stages could be added in series with transistor 26 so that transistor 26 would always be biased to saturation by current pulses from the Geiger-Mueller tube 10. However, in actual practice the current through transistor 26 is always greater than the amount required to saturate transistor 26, so that transistor 26 is biased to saturation during the time that Geiger-Mueller tube is ionized. When the radiation is sufficiently strong to ionize Geiger-Mueller tube 10 continuously, transistor 26 is biased to saturation continuously. Resistor 19 is used to insure that transistor 26 does not conduct when Geiger-Mueller tube 10 is not ionized.

With transistor 26 biased to saturation, the integrating circuit consisting of resistor 20 and capacitor 22 is charged through resistor 25. Since transistor 26 is biased to saturation resistor 25 determines the amount of charge received from each ionizing event. Thus by varying the value of resistor 25 the range over which the integrating circuit operates can be varied as required. It will be recognized that resistor 25 can be a variable resistor as shown, or it may consist of a number of resistors one or more of which are connected into the circuit by a switch.

The comparator consists of transistors 30 and 31 with their collectors having a common connection to the power supply 23 through resistor 33. A reference voltage for the comparator is provided by the voltage divider consisting of resistors 41 and 42. In operation, transistor 31 is normally biased to conduction by the reference voltage applied to the base thereof and transistor 30 is biased to nonconduction. The potential across capacitor 22 increases when the Geiger-Mueller tube 10 is receiving ionized radiation. A point is reached at which the potential across capacitor 22 will bias transistor 30 to conduction. When transistor 30 conducts, transistor 31 is biased to nonconduction. With transistor 30 conducting a bias current is provided through collector 35 of transistor 30 to base 38 of transistor 39 biasing transistor 39 to conduction. With transistor 39 biased to conduction, a bias current path is provided for transistor 45 to bias transistor 45 to conduction. Resistor 46 provides a feedback path to give a snap action to the comparator operation. With transistor 45 biased to conduction, the alarm circuit, represented by resistor 44, is coupled to power supply 23 and is made operative to provide an alarm showing that the present radiation level has been reached.

Since the reference voltage divider, resistors 41 and 42 and capacitor 43 is connected to the same power supply as the integrator circuit, resistor 20 and capacitor 22 changes in the power supply voltage effect both at the same time. Thus there is no need to provide a regulated power supply in order to insure that power supply fluctuations will not adversely affect the operation of the dosimeter. Capacitor 43 is chosen so that the resistor 41 and capacitor 43 time constant is the same as the integrator time constant. Thus fast charges in the power supply will act equally on the comparator and the integrator. Since a voltage regulator is not required, the circuit is smaller and also there is less drain on the power supply 23.

The embodiments of the invention in which an exclusive property or privilege is claimed are defined as follows:

1. A dose rate dosimeter, including in combination, A Geiger-Mueller tube having a predetermined ionization period following an ionizing event and developing an ionizing current of said predetermined period in response to said ionizing event, a power supply, integration means having a first terminal directly d-c connected to said power supply and a second terminal, switch means having a normal off state and an on state and first resistor means directly d-c connected in series between said second terminal and said power supply, and circuit means d-c coupling said switch means to said Geiger-Mueller tube, said switch means being responsive to said ionizing current to be switched to said on state whereby charging current is supplied to said integration means for the duration of said ionizing current, the resistance of said switch means in said on state being sufficiently low so that the magnitude of said charging current is established by said resistance means, said integration means acting to integrate said charging current and to develop an output signal which is a function of said charging current.

2. The dose rate dosimeter of claim 1 wherein, said first resistance means is variable.

3. The dose rate dosimeter of claim 2 wherein, said switch means is transistor means having a common electrode directly d-c connected to said power supply means, a control electrode directly d-c connected to said Geiger-Mueller tube for receiving said ionizing current so that a portion of said ionizing current flows through said control electrode to said common electrode and an output electrode, said first resistance means directly d-c connecting said output electrode to said integration means.

4. The dose rate dosimeter of claim 3 wherein, said transistor means is a single transistor having a base electrode directly d-c connected to said Geiger-Mueller tube, an emitter electrode directly d-c connected to said power supply and a collector electrode directly d-c connected to said first resistance means, and second resistance means coupled between said base and emitter electrodes.

5. The dose rate dosimeter of claim 4 further including, alarm means coupled to said integrating means, said alarm means being responsive to said output signal above a particular magnitude to develop an alarm signal.

6. The dose rate dosimeter of claim 5 wherein, said alarm means includes reference voltage means connected to said power supply to develop a reference voltage, and comparator means coupled to said reference voltage means and said integration means to develop said alarm signal with said output signal equal to said reference voltage.

7. The dose rate dosimeter of claim 6 wherein, the time constant of said reference voltage means is substantially equal to the time constant of said integration means.

* * * * *